D. HENSEL.
FILM REWINDER.
APPLICATION FILED APR. 26, 1912.
1,049,859.
Patented Jan. 7, 1913.
2 SHEETS—SHEET 1.
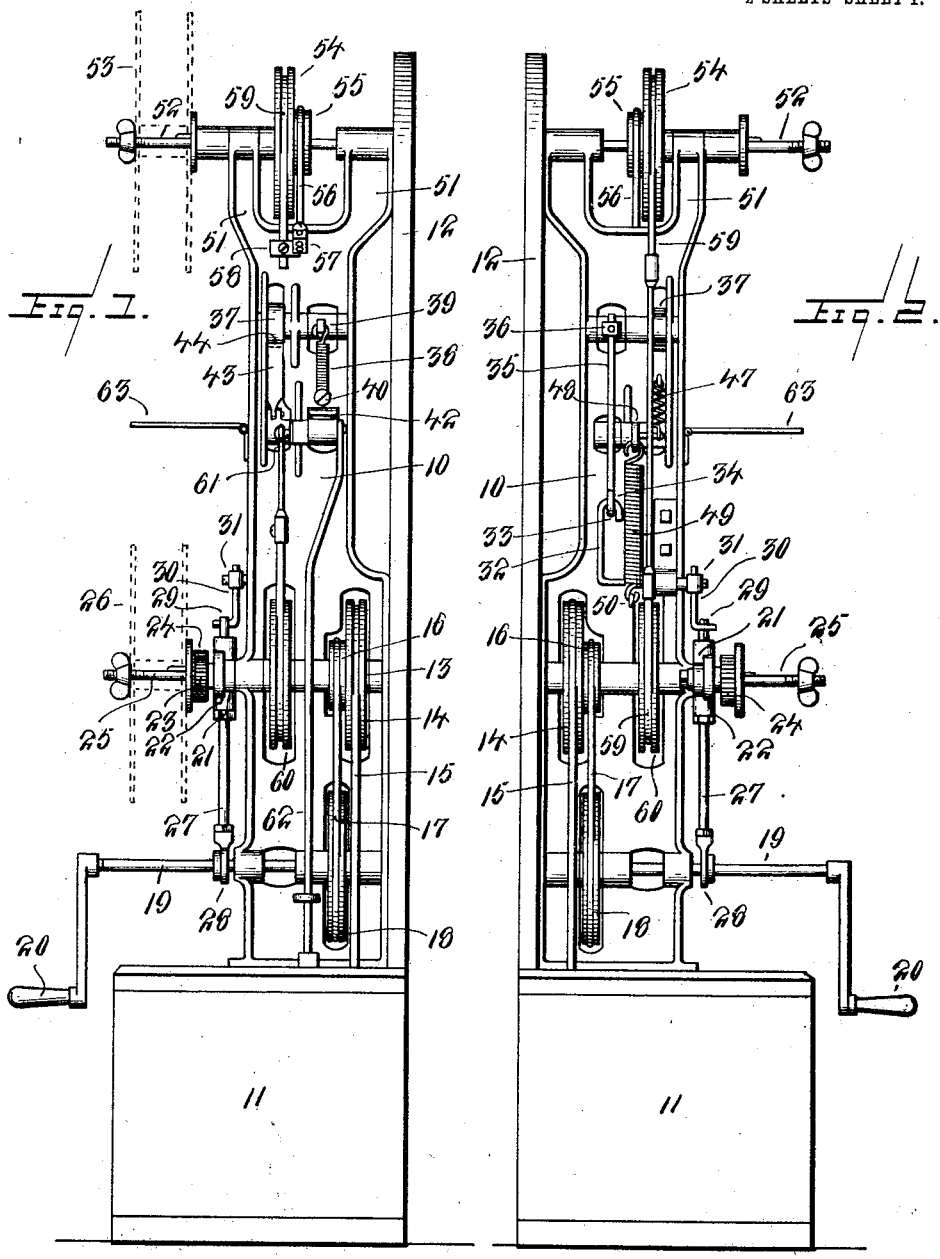
Witnesses
E. J. Ruppert.
F. A. Hoster.
Inventor
Dennis Hensel
By Victor J. Evans
Attorney

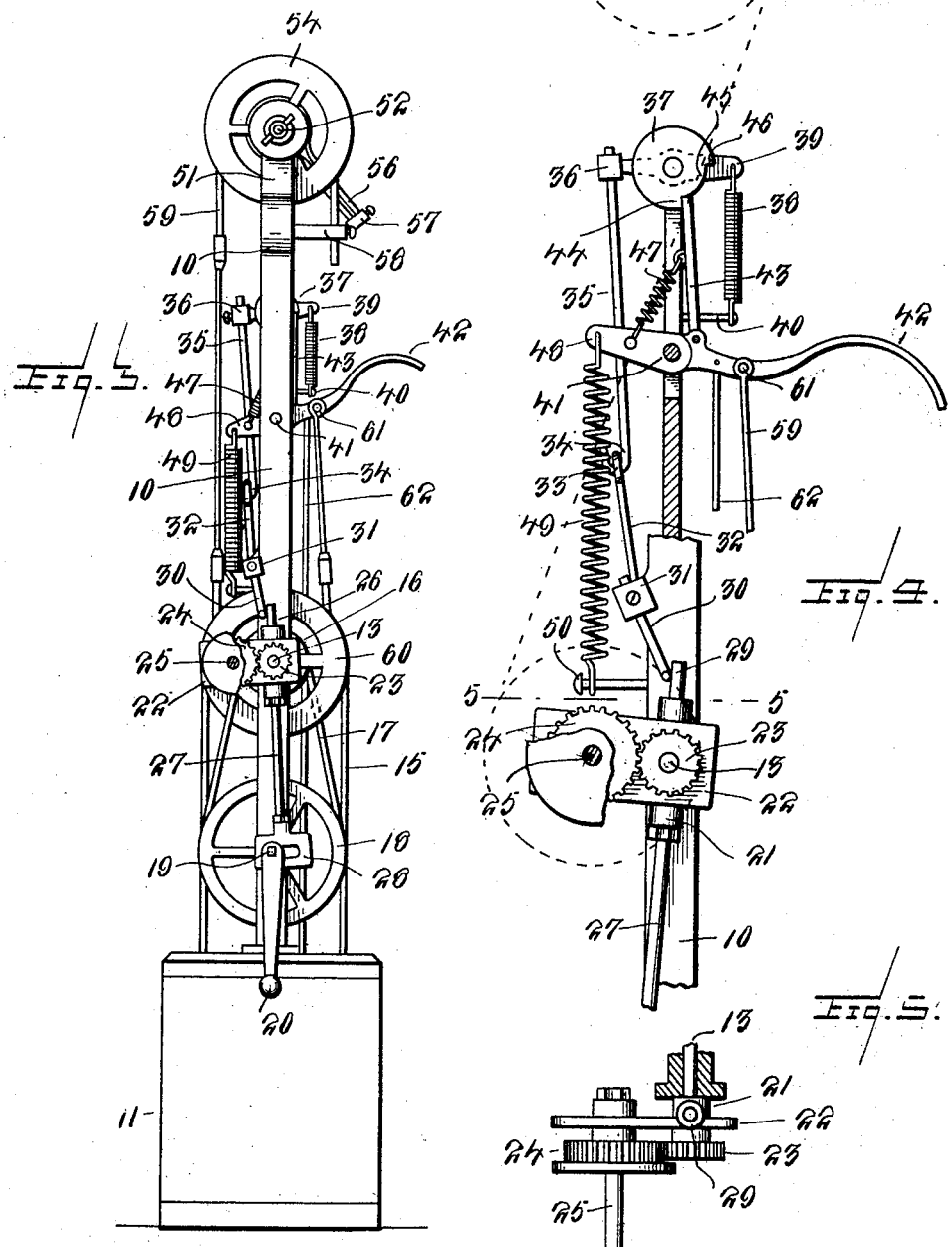

UNITED STATES PATENT OFFICE.

DENNIS HENSEL, OF YORK, PENNSYLVANIA.

FILM-REWINDER.

1,049,859.  Specification of Letters Patent.  Patented Jan. 7, 1913.

Application filed April 26, 1912. Serial No. 693,360.

*To all whom it may concern:*

Be it known that I, DENNIS HENSEL, a citizen of the United States, residing at York, in the county of York and State of Pennsylvania, have invented new and useful Improvements in Film-Rewinders, of which the following is a specification.

The invention relates to motion picture film rewinding machines and has for an object to provide a device for rewinding films on the primary reel to prepare the same for a reëxhibition of the pictures thereon.

My invention embodies among other features a device in which the friction produced when the films are rewound, will be automatic proportional to the speed at which the films are rewound, means for automatically causing the reeling operation of the film to cease in case the film should break, means for adjusting the tension of the film during the rewinding operation and means for automatically stopping the machine when the film has been entirely rewound.

For the purpose mentioned, use is made of a frame adapted to receive an empty reel and the reel containing the film which is to be rewound upon the empty reel, means for rewinding the film on the full or secondary reel onto the empty or primary reel, means for controlling the tension produced in winding the film upon the primary reel, means for stopping the rewinding of the film when the same is broken, a platform mounted to swing on the said frame and adapted to receive thereon the broken ends of the film for the purpose of reconnecting the same and means for stopping the rewinding operation of the film when the last portion of the film of the secondary reel has been wound upon the primary reel.

Reference is to be had to the accompanying drawings constituting a part of this specification, in which similar characters of reference denote corresponding parts in all the views and in which—

Figure 1 is a front elevation of my device. Fig. 2 is a rear elevation of my device. Fig. 3 is a side elevation, parts of the primary reel being broken away to disclose the underlying structure. Fig. 4 is an enlarged fragmentary side elevation of a portion of the stop mechanism of my device. Fig. 5 is a horizontal sectional view taken on the line 5—5 in Fig. 4.

Referring more particularly to the views,

I employ a T-shaped frame 10 secured upon a cabinet 11, containing an electrical motor or other suitable power-producing medium. Extending upwardly adjacent one side of the frame 10 is a plate 12, adapted to lie flat against a wall or other support for holding the machine firmly for use. A shaft 13 is journaled on the frame 10 and keyed thereto is a grooved pulley 14, having a belt 15 passed around the same and having connection with a suitable motor mounted within the cabinet 11. A smaller grooved pulley 16 is keyed to the shaft 13 and a belt 17 is passed around the pulley 16, the said belt being also passed around a grooved pulley 18 keyed to a shaft 19 journaled on the frame 10 and having a handle 20 connected to the outer end thereof so that if for any reason the motor in the cabinet 11 refuses to operate, the handle 20 can be operated to manually actuate the machine.

Journaled on the shaft 13, between the ends thereof, is a bearing 21 having a plate 22 integrally formed thereon, the said plate having connection with the shaft 13 adjacent one end of the plate so that the other end of the said plate will normally swing downwardly in a depending position relatively to the shaft 13. Keyed to the outer end of the shaft 13 is a toothed wheel 23 in mesh with a toothed wheel 24 keyed to a spindle 25 journaled on the free end of the plate 22, the mentioned spindle 25 being adapted to receive thereon the reel upon which the film is to be rewound, the mentioned reel being hereinafter called a primary reel and designated by the numeral 26. Extending downwardly from the bearing 21 is a rod 27 having a slotted head 28 secured to the lower end thereof with the shaft 19 extending through the slot of the said head so that the swinging movement of the plate 22 will be limited by the length of the slot in the head 28, which will swing, with the shaft 13 as a center when the plate 22 is swung relatively to the shaft 13, the rod 27, having the head 28 thereon, being rigid with the bearing 21, formed integrally with the plate 22 as mentioned heretofore. Formed on the upper end of the bearing 21 is a flange 29 adapted to engage the lower end of a rod 30 secured to a socket member 31, pivotally mounted on the frame 10 and having extended upwardly therefrom a rod 32, provided with an eye 33, having a hook 34 of a rod 35, passed therethrough, the upper end of the rod 35 being rigidly secured in a socket member 36 formed with a cam 37 journaled on the frame 10, a contractile spring 38 being secured to an arm 39 formed rigidly with the cam 37, the lower end of the said spring being secured to a pin 10 rigidly connected to the frame 10.

A shaft 41 is journaled on the frame 10 and secured to the said shaft is a cut out lever 42, having a locking bar 43 pivotally mounted thereon with the free end of the locking bar engaging the cam 37 and adapted to normally seat against a cam lug 44, formed on the cam 37, the mentioned cam being provided with a cut out portion 45 and a cam lug 46 to limit the turning movement of the cam by being engaged by the locking bar 43 as will be hereinafter more fully disclosed. A spring 47 is secured to an arm 48, of the cut out lever 42, an end of the said spring being connected to the locking bar 43 to normally retain the locking bar in engagement with the cam lug 44. One end of a contractile spring 49 is connected to a pin 50, rigidly secured to the frame 10, and the other end of the spring 49 is connected to the arm 48 of the cut out lever 42.

The upper end of the frame 10 terminates in forked portions 51 and journaled thereon is a spindle 52 adapted to receive a reel 53, which will be hereinafter known as the secondary reel. Keyed to the spindle 52 is a grooved pulley 54 and keyed to the said spindle adjacent the grooved pulley 54 is a smaller grooved pulley 55, a flexible brake band 56 being passed around the smaller grooved pulley 55 with the ends of the brake band adjustably secured in a socket 57 secured to a bearing 58 rigidly mounted on the frame 10. A main brake band 59 is secured to the bearing 58 and passes around the larger grooved pulley 54, the said brake band 59 being then passed downwardly and around the grooved pulley 60 keyed to the shaft 13, the said brake band being then extended upwardly and provided at an end thereof with an eye 61 for pivotal connection with the cut out lever 42, it being understood that the brake band 59 constitutes the main brake band and the brake band 56 constitutes the auxiliary brake band, the main brake band 59 being adapted to normally engage the pulleys 54 and 60 in a loose manner. Connected to the cut out lever 42 is a controlling rod 62 extending downwardly through an opening in the cover of the cabinet 11, the said controlling rod being connected to the switch for the purpose of operating the same to stop or start the motor within the cabinet.

Now assuming that the parts of my device are in the position disclosed in Figs. 1, 2 and 4 and that the secondary reel 53 is mounted on the spindle 52, the said secondary reel having wound thereon a film roll, with the end of the film roll connected to the primary reel 26 mounted on the spindle 25 and upon which it is desired to wind the film roll, when the motor in the cabinet 11 is started, the belt 15 having connection with the motor and passing over the pulley 14, will impart rotation to the spindle 25 through the medium of the toothed wheels 23 and 24. Now as the film roll is wound up on the primary reel, and unwound from the secondary reel, the tension of the film roll between the reels will produce an upward pull on the free end of the plate 22, thus retaining the plate in substantially horizontal position. By employing the auxiliary brake band 56, frictionally engaging the grooved pulley 55, if the speed of the spindle 52 should materially increase for any reason, the increase in speed will cause the brake band 56 to engage the pulley 55 with greater frictional force as will be readily understood, thus reducing the speed of the spindle 52 to its normal operation, it being readily discernible with any increase in the speed of the pulley 55 will cause the brake band 56 to exert greater frictional force on the pulley, in proportion to the increase of speed of the pulley. Now if the film, as the same is being rewound from the secondary reel onto the primary reel, should suddenly break, the upward pulling effect of the film will be discontinued and consequently the free end of the plate 22, having the weight of the primary reel 26 thereon, will gravitationally move downward, the downward movement of the said plate being limited by the head 28 having the slot therein and through which is extended the shaft 19. As the plate 22 moves downwardly, the rod 29 will actuate the lower end of the rod 30, thus actuating the rod 32 in the opposite direction and exerting a pull on the rod 35, sufficient to disengage the locking bar 43 from the cam lug 44, this being accomplished by a slight turning movement of the cam 37, due to the downward pull of the rod 35. At the moment that the locking bar 43 is released from engagement with the cam lug 44, the contractile pull of the spring 49 will swing a portion of the cut out lever 42 upwardly so that the upper end of the locking bar 43 will engage the cam lug 46. Now as the outer portion of the cut out lever 42 is moved upwardly, the main brake band 59, which has an end thereof secured to the cut out lever 42 and has the other end thereof secured to the frame 10 after being passed around the pulleys 54 and 60, will be moved into greater frictional engagement with the pulleys 54 and 60 thus overcoming the rotation of the pulleys and causing the same to stop. At the same moment that the outer portion of the cut out lever 42 moves upwardly, an upward pull is exerted on the controlling rod 62 having connection with the lever 42, thus operating the switch within the cabinet 11 to stop the motor within the cabinet and the entire device will then be in inoperative position, the primary and secondary reels being prevented from rotating by the main brake band 59 in close frictional engagement with the pulleys 60 and 54 respectively and the main operating power of the machine will also be in inoperative position, due to the action of the controlling rod 62, operating the switch within the cabinet to stop the motor within the cabinet.

Mounted to swing on the frame 10 is a platform 63, the said platform being adapted to normally fold against the frame and movable into a horizontal position so that when the film is broken, the broken ends of the film can be placed upon the platform 63 and spliced or reconnected in the usual manner. After this has been accomplished, the platform 63 is swung into vertical or folded position and by exerting a downward pressure on the cut out lever 42, the controlling rod 62 will be operated to restart the motor within the cabinet 11, the locking bar 43 will be moved to resume its normal position, in engagement with the cam lug 44 and the tension on the main brake band 59 will be released, thus permitting a rotation of the pulleys 54 and 60 and consequently permitting the spindles 52 and 25 to rotate respectively, the plate 22 being again moved to substantially horizontal position when the film roll commences to wind up on the primary reel 26 and unwind on the secondary reel 53.

It will be understood that if the film should not break while the same is being rewound, when the entire film has been wound upon the primary reel, the machine will be automatically stopped in the manner described, in view of the fact that when the last end of the film leaves the secondary reel, the upward tension of the film, between the primary and secondary reels will be released, thus causing the plate 22 to swing downwardly and actuating the stop mechanism in the same manner that the mentioned mechanism would operate when a break occurs in the film.

I claim:—

1. A film rewinder comprising a frame, a plate mounted to swing gravitationally on the said frame, a spindle mounted to turn on the said plate and adapted to receive a primary reel, a second spindle mounted on the said frame and adapted to receive a secondary reel containing a film, the said plate being adapted to swing gravitationally when the said film has been wound upon the said primary reel, means for imparting rotation to the first-mentioned spindle, a cut out lever, a brake band connected to the said cut out lever and a connection between the said plate and the said cut out lever for stopping the rotation of the first mentioned spindle and applying the said brake band when the said film has been wound upon the said primary reel to gravitationally swing the said plate.

2. A film rewinder comprising a frame, a plate mounted to swing on the said frame, a spindle mounted to turn on the said plate and adapted to receive a primary reel, a second spindle mounted on the said frame and adapted to receive a secondary reel containing a film, the said plate being adapted to swing gravitationally when the film on the said secondary reel has been wound upon the said primary reel, means for imparting rotation to the first-mentioned spindle, a cut-out lever and a connection between the said plate and the said cut-out lever for stopping the rotation of the first-mentioned spindle when the said film has been wound thereon to gravitationally swing the said plate.

3. A film rewinder comprising a frame, a plate mounted to swing on the said frame, a spindle mounted to turn on the said plate and adapted to receive a primary reel, a second spindle mounted on the said frame and adapted to receive a secondary reel containing a film to be wound upon the said primary reel, the said plate being adapted to swing when the said film has been wound upon the said primary reel, means for imparting rotation to the first-mentioned spindle, means for stopping the rotation of the first-mentioned spindle when the said plate is swung relatively to the said frame and means for limiting the swinging movement of the said plate.

4. A film rewinder comprising a frame, a spindle mounted to turn and to swing on the said frame and adapted to receive a primary reel, a second spindle mounted on the said frame and adapted to receive a secondary reel containing a film, the said first-mentioned spindle being adapted to swing relatively to the said frame when the film on the said secondary reel has been unwound therefrom and wound onto the said primary reel, means for imparting rotation to the first-mentioned spindle, a brake band and means for operating the said brake band and stopping the rotation of the first-mentioned spindle when the same is swung relatively to the said frame.

5. A film rewinder comprising a frame, a spindle mounted to swing and to turn on the said frame and adapted to receive a primary reel, a second spindle mounted on the said frame and adapted to receive a secondary reel containing a film, the said film being unwindable from the said secondary reel and onto the said primary reel, a brake band and means for moving the said brake band into braking position when the first-mentioned spindle swings on the frame, the said first-mentioned spindle being adapted to swing on the frame when the film has been unwound from the said secondary reel and onto the said primary reel.

6. A film rewinder comprising a frame, a plate gravitationally mounted on the said frame, a spindle mounted on the said plate and adapted to receive a primary reel, a second spindle mounted on the said frame and adapted to receive a secondary reel, means for imparting rotation to the first-mentioned spindle to unwind the film from the said secondary reel and onto the said primary reel, the said plate being movable gravitationally when the said film has been unwound from the said secondary reel and means for stopping the rotation of the first-mentioned spindle when the said plate moves gravitationally.

7. A film rewinder comprising a frame, a plate gravitationally mounted on the said frame, a spindle for receiving a primary reel and mounted on the said plate, a second spindle mounted on the said frame to receive a secondary reel, the said plate being movable gravitationally when the film has been wound from the secondary reel and onto the primary reel, a brake band and a connection between the said plate and the said brake band for moving the said brake band into braking position when the said plate is moved gravitationally.

8. A film rewinder comprising a frame, a plate gravitationally mounted on the said frame, a spindle mounted to move gravitationally with the said plate and adapted to receive a primary reel, a second spindle journaled on the said frame and adapted to receive a secondary reel, a brake band, means for imparting rotation to the first-mentioned spindle and means for moving the said brake band into braking position when the film has been unwound from the said secondary reel and onto the said primary reel so that the said plate will be moved gravitationally.

In testimony whereof I affix my signature in presence of two witnesses.

DENNIS HENSEL.

Witnesses:
 FRED. SCHULZE,
 G. P. KOCH.